July 7, 1959 A. CRAWLEY ET AL 2,893,023
SINGLE STATION BOOK PRESSING AND CREASING MACHINE
Filed Dec. 3, 1956 7 Sheets-Sheet 1

Fig. 1

INVENTORS.
Arthur Crawley.
Thomas E. Ingle.
BY Roland W. Wagner.
Wood, Herron & Evans.
ATTORNEYS.

July 7, 1959 A. CRAWLEY ET AL 2,893,023
SINGLE STATION BOOK PRESSING AND CREASING MACHINE
Filed Dec. 3, 1956 7 Sheets-Sheet 3

INVENTORS.
Arthur Crawley.
BY Thomas E. Hugle.
Roland W. Wagner.
Wood, Herron & Evans.
ATTORNEYS.

July 7, 1959     A. CRAWLEY ET AL     2,893,023
SINGLE STATION BOOK PRESSING AND CREASING MACHINE
Filed Dec. 3, 1956     7 Sheets-Sheet 5

INVENTORS.
Arthur Crawley.
Thomas E. Dugle.
BY Roland W. Wagner.
Wood, Herron & Evans.
ATTORNEYS.

Fig. 13

United States Patent Office 2,893,023
Patented July 7, 1959

2,893,023

SINGLE STATION BOOK PRESSING AND CREASING MACHINE

Arthur Crawley, Newton, Thomas E. Dugle, Cincinnati, and Roland W. Wagner, Sharonville, Ohio, assignors to Crawley Book Machinery, Inc., Newport, Ky., a corporation of Kentucky Application December 3, 1956, Serial No. 625,746

12 Claims. (Cl. 11—1)

This invention relates to a machine for creasing and pressing books after the book fillers have been inserted into the covers, with wet adhesive applied to the meeting surfaces of the fillers and covers.

In the fabrication of books, each page block or filler is assembled and joined together by stitching or other securing means; the cover is fabricated as a separate unit. At final assembly, a liquid paste or glue is applied to the surfaces of the filler or cover, then the cover is slipped upon the filler to form the assembled book. In order to create a good adhesive bond and to flatten the freshly pasted book, it is placed between flat surfaces and held under pressure for a drying period. This is known in the binding industry as a pressing or smashing operation.

In order to form the hinge lines or joints of the book, creases are pressed into the cover adjacent the rounded end of the book along opposite sides. The creases or score lines may be formed at the same time the body of the book is pressed, or they may be impressed in a separate operation. The creasing operation sometimes is referred to as nipping.

The conventional method has been to crease and press the books between press boards, each having one or more ridges or beads projecting from its surface. The freshly glued books are placed between pairs of press boards with the beads extending along the covers adjacent the rounded ends, then pressure is applied to the press boards, causing the beads to impress the creases while the flat surface of the boards press the body portion of the books and covers. The books are allowed to remain under pressure for a prolonged period which may vary from one type of book to another. While the press boards provide good results, it is obvious that the process involves a great deal of manual labor and that the drying period limits production.

More recently, the book binding industry has turned to various types of power-operated machines for executing the pressing and creasing operations in a rapid automatic manner. By way of example, such a machine may comprise pairs of flat pressing plates and heated creaser jaws, together with actuating means for opening and closing them. The freshly pasted books are advanced by feed means in stepwise fashion between the plates and jaws in time with their opening and closing movements, such that the books are finished rapidly by repeated applications of heat and pressure at a series of pressing and creasing stations. The automatic machines are best suited for fairly large binderies where production is high; they are not well suited for smaller establishments engaged in specialized work or operating at a limited production rate.

The present invention is directed to a relatively inexpensive single station pressing and creasing machine in which the books are fed individually by hand. The machine is particularly suited to small shops either in the production of new books or in attaching new covers to damaged books.

One of the primary objectives of the invention has been to provide a power-operated, hand-fed single station machine, which accommodates itself to various thicknesses of books within its operating range without any adjustment of parts, and which operates through an automatic pressing and creasing cycle, such that an inexperienced user may operate the machine with consistently good results.

In general, the machine embodies a pair of flat, normally open smashers or presser plates residing in a horizontal plane parallel with one another; a pair of heated, normally open nippers or creaser jaws residing along the front edges of the presser plates, and a self-cycling fluid pressure apparatus including a presser cylinder and creaser cylinder for forcing the presser plates and creaser jaws in sequence under preselected pressure against the book during a timed cycle. Accordingly, the operator simply locates the book upon the lower presser plate or platen and initiates the cycle, causing the fluid pressure apparatus to close the jaws, then the plates, whereby they apply heat and pressure for the timed dwell period. At the end of the cycle, the jaws and platen open automatically allowing the operator to remove the finished book and insert the next one to be finished.

Another objective has been to provide a mechanism which inherently is safe for use by an inexperienced operator, and which positions the book accurately with respect to the creaser jaws or nippers. For this purpose, the upper creaser jaw is mechanically connected to a foot treadle, such that the operator may temporarily clamp the book in position prior to the power cycle by depressing the treadle, while the upper presser plate remains in its elevated position. Accordingly, the closed creaser jaws clamp the book temporarily in position with respect to the presser plates before the power cycle is initiated.

Since the creasing jaws are held closed by the operator, there is no danger of injury to the hands or fingers while locating the book. Moreover, since the creaser jaws are closed before the presser plate descends under power, there is no danger of the hands accidentally being caught between the presser plates.

After the operator has thus located the book, and while holding the upper jaw down in clamping position with the treadle, the pressing and creasing cycle is initiated by depressing a start button. At this point, the fluid pressure system first lowers the upper presser plate under high pressure upon the book for the pressing operation, then the pressure system applies the creasing pressure to the creaser jaws (previously closed with the treadle) allowing the operator to release the treadle. After a timed creasing and pressing cycle, the creaser jaws, then the presser plates separate for the next cycle.

Briefly, the finishing operation is regulated by the amount of pressure generated by the plates and jaws, the duration of the dwell period, during which the plates and jaws are in pressure engagement with the book, and the temperature to which the creaser jaws are heated. These three factors make it possible to set up the machine quickly and conveniently to finish various types of books in the most rapid and efficient manner. It will be understood that the pressure required in the smashing operation depends largely upon the area of the book and also upon its thickness. Moreover, the thickness of the covers, the type of adhesive, and other variables require suitable adjustment as to pressure, dwell timing, and temperature.

A further objective of the invention has been to provide self-contained pressure mechanisms for the presser plates and creaser jaws, so arranged that the set of plates and set of jaws operate independently of one another, the creaser jaws being free to float with respect to the book while engaging it under pressure. After the presser plates engage the body of the book under high pressure, the creaser jaws, by virtue of their floating action, apply equalized pressure upon the crease lines or joints, thus impressing crease lines of equal depth along opposite sides. A further advantage of the self-contained pressing and creasing mechanisms arises from the fact that the pressing and creasing pressures are restricted to the self-contained mechanisms without imposing strains upon the machine housing.

In its preferred form, the cycling apparatus embodies a hydraulic pressure system under the control of an electrical circuit having an adjustable timing mechanism. The presser and creaser cylinders are activated hydraulically under the control of the electrical circuit, the start button, noted above, being interconnected in the control circuit for initiating the sequential closing of the smashers and nippers, the timed dwell period, and the opening of the smasher and nippers.

To actuate the presser plate and the creaser jaw in sequence, a by-pass principle is utilized in the hydraulic system, such that the pressure first is directed to the presser cylinder, then when full pressure is reached, back pressure from the presser cylinder is conducted to the creaser cylinder. The hydraulic apparatus provides certain significant advantages over mechanically operated plates and jaws. In the first place, the cylinders do not have a fixed stroke, consequently they will accommodate books of any thickness within the operating range of the apparatus without adjustment. Secondly, the hydraulic system may readily be adjusted to provide the specific smasher and creaser pressures, noted above, by means of adjustable pressure control devices. Because of the advantages provided by the hydraulic apparatus, the machine has equal utility in repetitive production operations or in the repair of individual books, such as in library work.

In producton work, where the books are of uniform size, the treadle usually is not operated; instead, a gauge fixture is adjusted to locate the books properly to the creaser jaws. Accordingly, the operator simply feeds the books between the plates in contact with the gauge then depresses the start button to initiate the cycle. After the dwell period, which amounts only to a few seconds, the jaws and plates open in sequence for removal of the finished book; hence, the operator is able to finish successive books very rapidly.

On the other hand, when engaged in repair work, the individual books may require different pressures and dwell periods. In this case, the jaw temperature and pressure, the plate pressure, and the dwell period may be adjusted conveniently to suit each book. Since the books may vary in size, the gauge fixture is not used in repair work; therefore, the treadle is operated to locate each book individually by clamping it preliminary between the creaser jaws.

The various objects and advantages of the invention are disclosed in greater detail in the following description with reference to the drawings which disclose a preferred embodiment of the invention.

*General arrangement*

Figure 1:
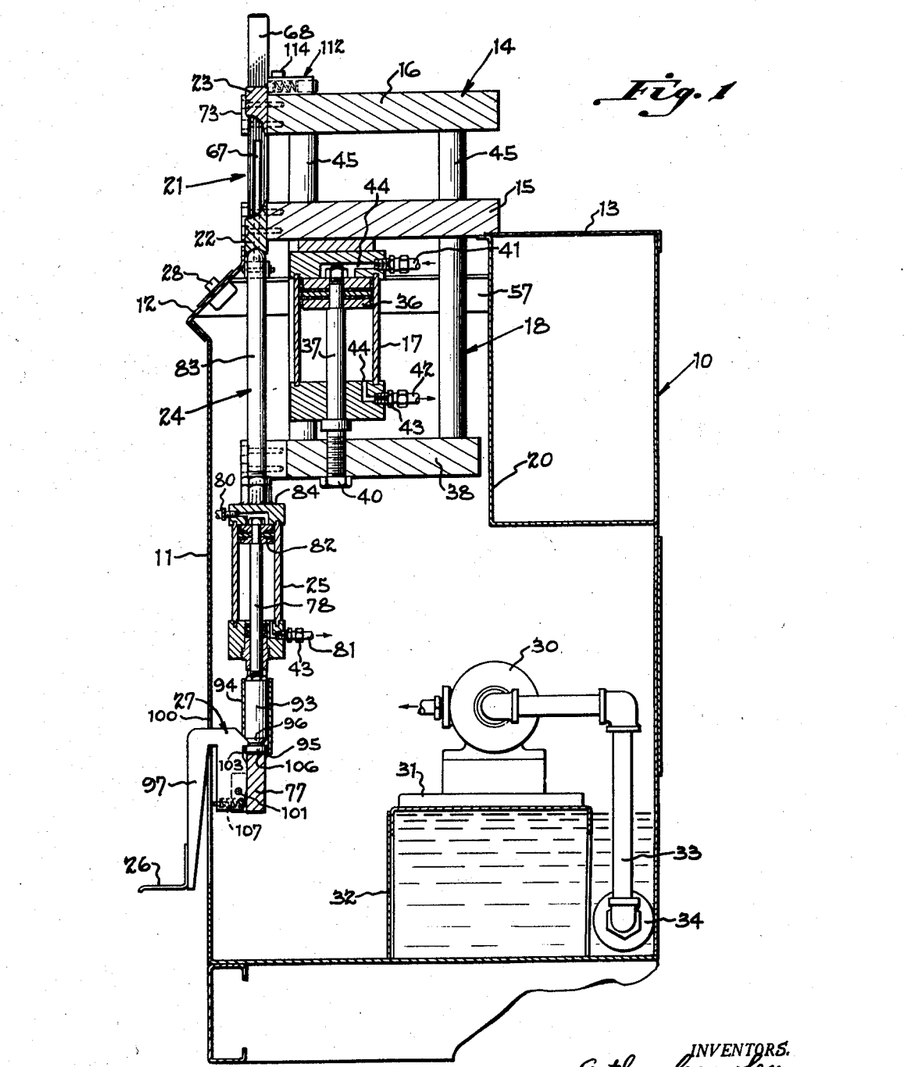
Figure 1 is a vertical sectional view taken through the pressing and creasing machine, showing the general arrangement of parts with the presser and creaser mechanisms in open position to receive a book at the start of a cycle.
Figures 2, 3, 4, 5, 6:
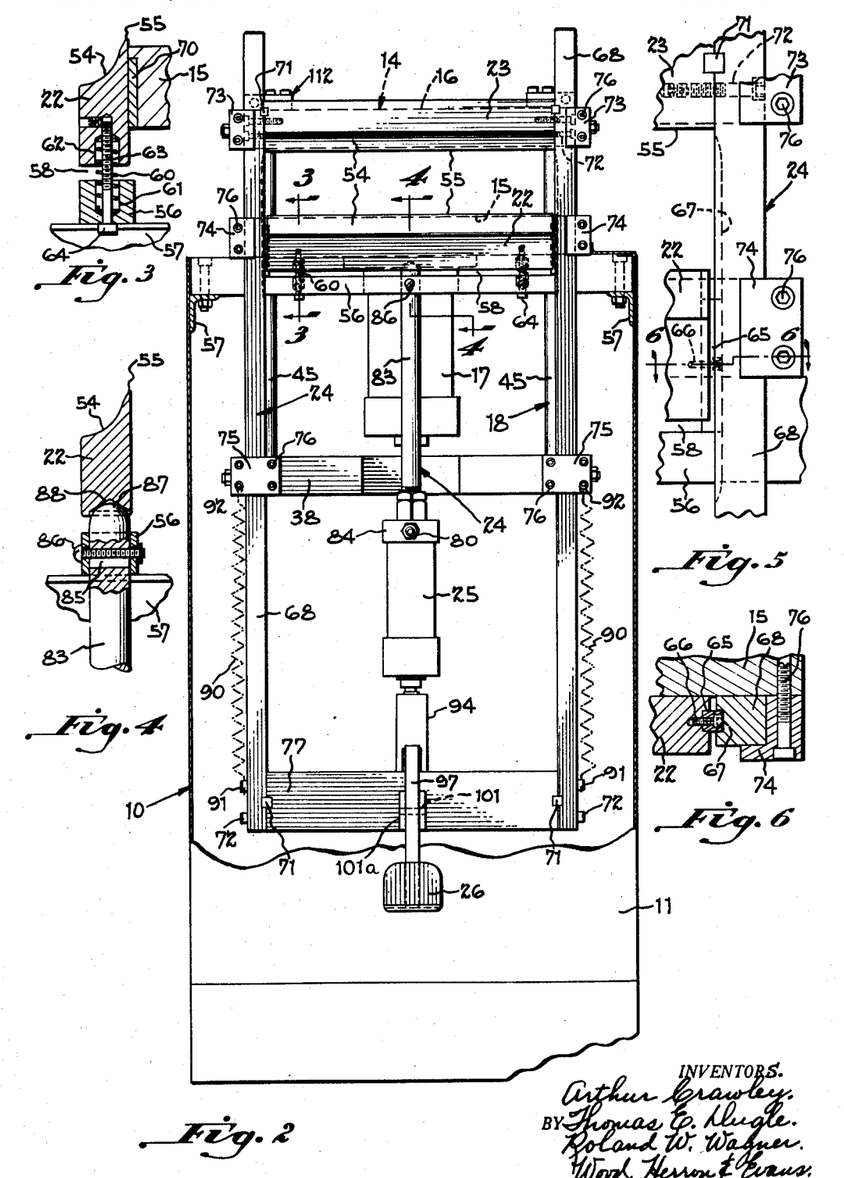
Figure 2 is a front view of the machine in the position of Figure 1, the housing of the machine being partially broken away to illustrate the internal mechanism.
Figure 3 is an enlarged sectional view taken along line 3—3 of Figure 2, detailing the yieldable mounting of the lower creaser jaw.
Figure 4 is an enlarged sectional view taken along line 4—4 of Figure 2, showing the lower creaser jaw and the support for the compression rod of the creaser cylinder which applies pressure to the lower jaw.
Figure 5 is an enlarged fragmentary view taken from Figure 2, detailing a portion of the presser and creaser mechanism.
Figure 6 is a sectional view taken along line 6—6 of Figure 5, detailing the guide mechanism of the creaser frame with respect to the platen and lower jaw.

Referring to Figures 1 and 2, which illustrate a machine embodying the principles of this invention, the components of the machine are mounted in a housing 10. The housing is fabricated from sheet metal providing a front wall 11 which includes at its upper portion an outwardly inclined control panel 12. The housing includes the usual side and rear walls supporting a top panel 13 which carries the pressing and creasing mechanism. The housing is suitably braced internally and preferably is of welded construction.

The pressing or smasher mechanism, which is indicated generally at 14, comprises the stationary presser plate or platen 15 and the movable presser plate 16 mounted parallel with and above the platen. The pressing mechanism is actuated by the hydraulic cylinder indicated at 17 which is connected with the upper presser plate 16 by a presser frame 18, as described in detail later. The upper presser plate 16 normally resides in the elevated position shown in Figures 1, 2 and 10 and is moved downwardly into engagement with the book when the cycle is initiated. It will be noted that the presser frame 18 extends downwardly through the platen into the housing, with the presser cylinder 17 residing between the platen and lower end of the presser frame. The arrangement is such that the book smashing pressure is developed by spreading or thrust force acting between the platen and lower end of the presser frame; accordingly, the forces are isolated from the housing 10, while the weight load of the presser mechanism is carried by the top panel 13. The top panel may be suitably reinforced as at 20 in its upper portion beneath the pressing mechanism.

The creaser or nipper mechanism, which is indicated generally at 21, comprises a lower floating creaser jaw 22 mounted at the forward edge of the platen, and a movable upper jaw 23 carried by the creaser frame 24. The lower portion of the creaser frame likewise extends downwardly into housing 10 and is guided for vertical movement with respect to the presser mechanism 14, as explained later. The creaser cylinder 25 is located within the housing and is suspended from the housing below the lower jaw 22, the jaw in turn being yieldably supported by the platen 15. The creaser cylinder 25 also creates a spreading or thrust force between the lower jaw 22 and creaser frame 24 to bring the upper jaw 23 down upon the joints of the book after the presser mechanism has engaged it under pressure.

The creaser frame 24 includes a treadle 26 residing at the lower portion of the front wall, which the operator may depress to bring the upper jaw down preliminarily into clamping engagement with the book along its joint lines. For this purpose, a latching device, indicated generally at 27 (Figure 12), allows the presser frame to be shifted downwardly by depressing the treadle, while the piston of the creaser cylinder remains in its normal elevated position.

As best shown in Figure 1, the upper presser plate and creaser jaw normally reside in elevated position. The housing supports the platen at an elevation convenient to the operator, the books being placed manually on the platen, the creaser jaws delineating the front or feeding side of the machine. While holding the book manually in position, the operator depresses treadle 26 to bring down the upper jaw 23 and thereafter depresses the start button 28 which is mounted at the inclined control panel 12. The pressure gauges and other control elements, as explained later, also may be mounted on the control panel.

Hydraulic pressure for operating the cylinders is developed by the hydraulic pump 30 (Figure 1) which is mounted upon a support structure 31 in the lower portion of the housing. The hydraulic fluid is contained in a fluid reservoir or sump indicated at 32 disposed below the pump and connected to the pump by an intake conduit 33 which may include the usual filter 34 to strain out solid particles before the fluid is circulated through the hydraulic system. The hydraulic system and electrical control circuit are disclosed later with reference to Figure 14.

*Pressing mechanism*

Figure 8:
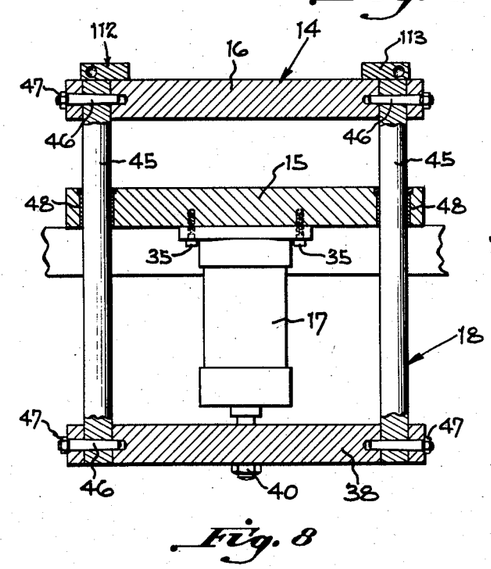
Figure 8 is a sectional view taken along line 8—8 of Figure 7, detailing the construction of the presser mechanism.

As best shown in Figures 1 and 8, the lower presser plate or platen 15, which is mounted upon top panel 13 of the housing, comprises a thick metal slab to provide rigidity. The platen may be provided with electrical heating elements as shown diagrammatically in Figure 14; however, under normal operations the plates are not heated. Since the heating elements and their use is well known, they have been omitted from the detail drawings. The presser or smasher cylinder 17 is secured to the undersurface of the platen as at 35, and depends downwardly into the interior of the housing.

Cylinder 17 includes a piston 36 having a piston rod 37 which projects downwardly from the cylinder, its lower end being threaded through a heavy actuating plate 38 which forms the base of the presser frame 18. The piston rod is securely locked to plate 38 by a nut 40 which is threaded upon the lower end of the piston rod below the actuating plate.

Figures 14, 15:
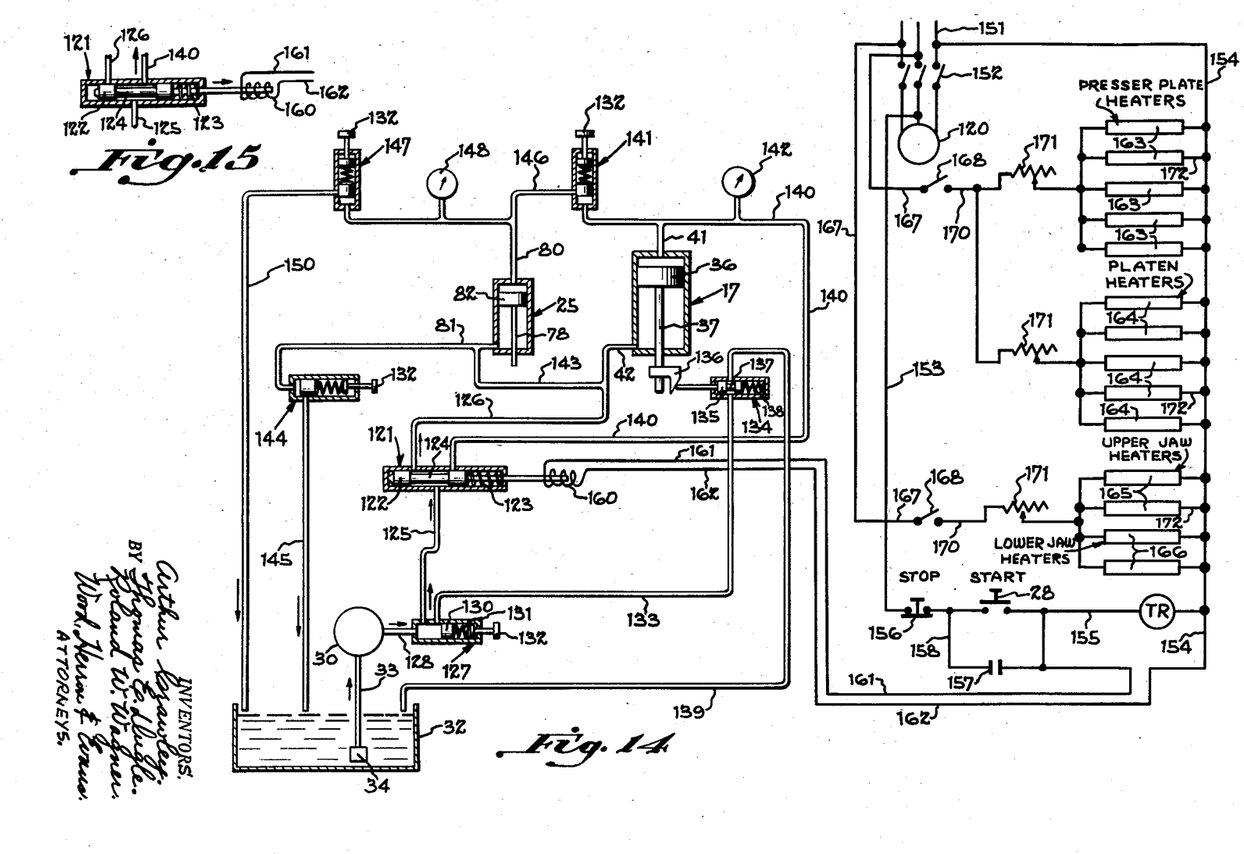
Figure 14 is a diagrammatic view showing a hydraulic and electrical system for providing the automatic pressing and creasing cycle.
Figure 15 is a diagrammatic view showing the cycle control valve of Figure 14 in its second position.

Hydraulic fluid is conducted to and from the upper and lower ends of the cylinder by way of the conduits 41 and 42, which preferably are flexible (Figures 1 and 14). Each conduit includes a suitable fitting 43 which is threaded into respective bores 44 communicating with the cylinder above and below its piston 36. It will be understood that the piston will move downwardly or upwardly upon application of hydraulic pressure by way of conduit 41 or 42. Downward motion of the piston is transmitted by way of actuating plate 38 to the upper presser plate 16 through the four tension rods 45 of the presser frame.

Figure 7:
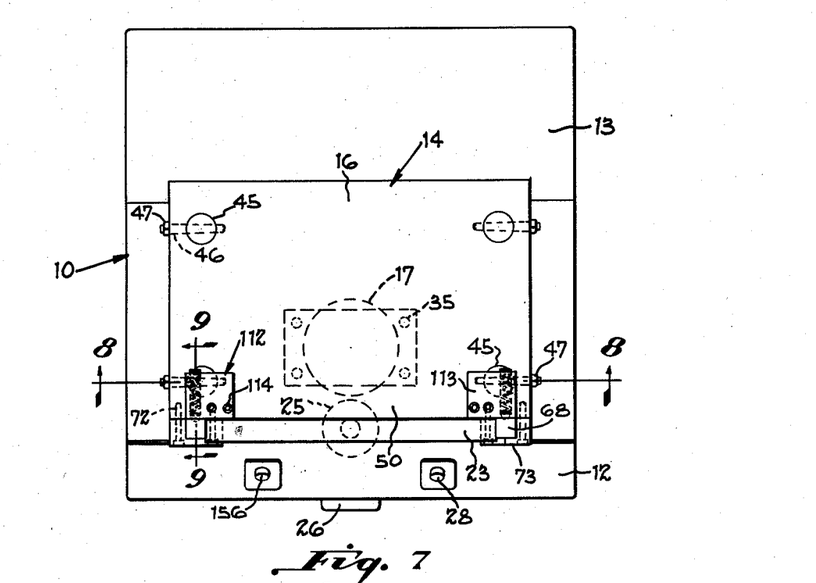
Figure 7 is a general top plan view of the machine.

In the present example, as shown in Figure 7, the presser frame is provided with four cylindrical tension rods 45 joining the four corners of the actuating plate 38 to the upper presser plate. The lower end of each tension rod is anchored to the respective corner portions of the actuating plate 38 by taper pins 46 or the like (Figure 8). Each taper pin may include a threaded end of reduced diameter projecting outwardly and engaged by a nut 47 for withdrawal of the pin if necessary.

The intermediate portions of the tension rods slidably pass through guide bushings 48 which are seated in bores formed in the stationary platen 15. Lubricant fittings of a conventional type (not shown) communicate with the bushings to maintain a supply of lubricant on the bearing surfaces.

The upper ends of the tension rods pass through the corner portions of the upper presser plate and are secured by taper pins 46 as noted previously. The upper presser plate 16 is similar to the stationary platen 15 and under normal operation is not heated. However, it may also include electrical heating elements as noted with respect to the platen.

The upper presser plate normally resides in the elevated position shown in Figure 1, such that the thickest book for which the machine is intended may be placed in pressing position with adequate clearance. As described later with reference to the hydraulic system shown in Figure 14, the plate is maintained in this position by hydraulic fluid trapped beneath the piston 36 of presser cylinder 17.

When the cycle is initiated and fluid pressure is admitted above the piston by way of conduit 41, a valve in the hydraulic system opens to allow the fluid trapped below the piston to be exhausted by way of conduit 42. During downward motion, the presser plate first takes up the clearance above the book on the platen, then the hydraulic pressure builds up within the cylinder as the book impedes further downward motion. The pressure build-up continues until a predetermined back pressure develops; at this point, a pressure responsive apparatus of the control system allows the fluid to by-pass while maintaining the pressure of the plate upon the book. The mechanism is shown in pressing position in Figure 11.

As explained earlier, the hydraulic apparatus incorporates adjustable control means for regulating the pressure at which by-passing occurs, whereby the presser and creaser mechanisms engage the book under preselected pressures. The regulating apparatus preferably included hydraulic gauges which may be calibrated to indicate directly the force imposed upon the book. In its preferred arrangement, the hydraulic system utilizes back pressure from the presser cylinder to actuate the creaser cylinder 25 after the presser plates have reached maximum pressure. This action is described later with reference to the control system shown in Figure 14.

Figure 11:
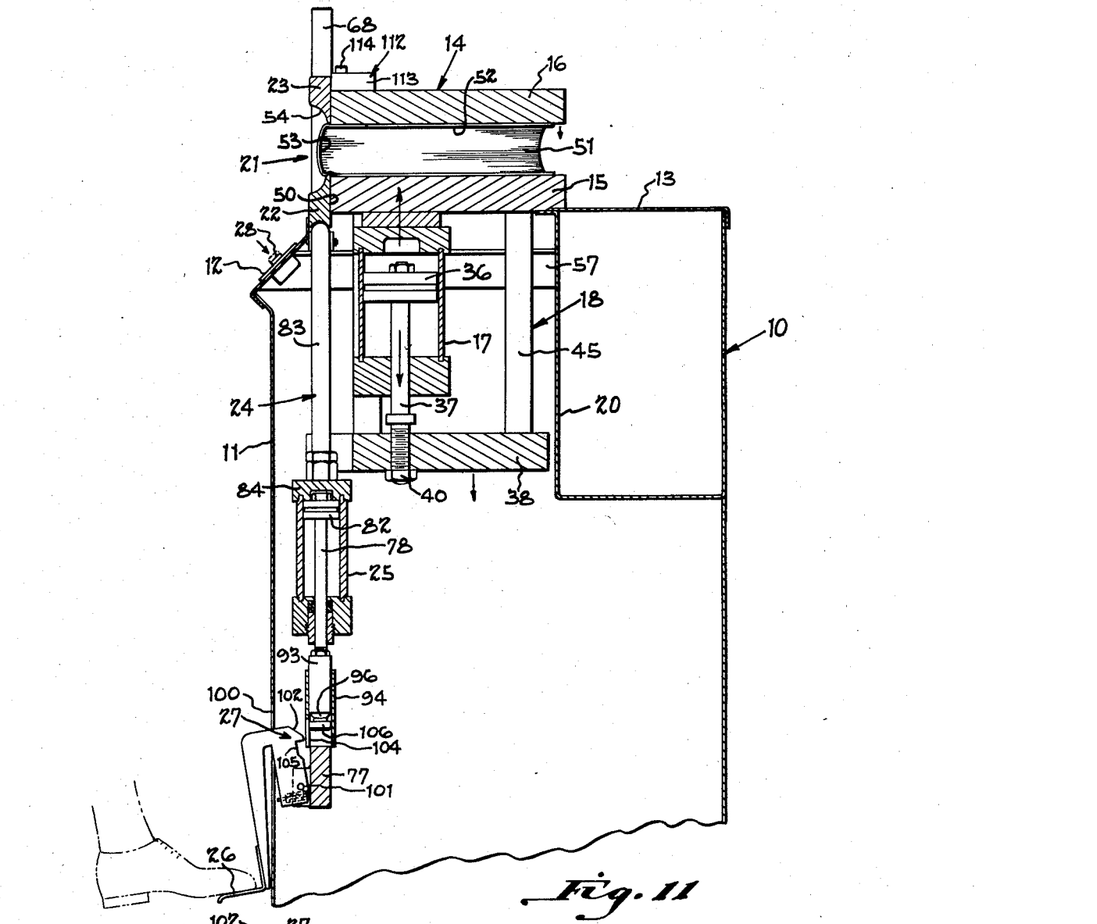
Figure 11 is a view similar to Figure 10, showing the upper presser plate shifted down under pressure into engagement with the body of the book after the automatic cycle is initiated.

It will be noted in Figure 11, that the presser cylinder 17 is located off-center, that is, toward the forward edge 50 of the platen. In finishing the book, it is necessary to press the page block 51 as well as the book cover 52 in order to bring the sides of the book into parallel relationship. However, the rounded or bound edge 53 of the page block, which resides along the forward or receiving edge 50 of the platen, requires the greatest amount of pressure since the individual pages tend to diverge outwardly from the bound edge. Moreover, the smaller books have an area less than the area of the plates, such that they occupy a position off-center and toward the receiving portion of the plates. It will be seen therefore, that if the cylinder were located at a centralized point relative to the platen, then the upper presser plate would tend to cant as it impinges upon the bulkier portion of the book adjacent the bound edge or upon books having a small area. The tendency to cant, while resisted by the bearing action of the guide bushings 48, nevertheless would impose excessive wear upon the bearing surfaces. The off-center location of the cylinder compensates for the average bulge effect of various types of books and their average size, thereby to provide substantially equalized pressure, with the result that the upper presser tends naturally to remain parallel with the platen under high pressure engagement with the book, with bearing strains substantially eliminated.

As pointed out earlier, the temperature and compression force of the creaser jaws provides rapid heat penetration through the joints so as to dry the liquid adhesive rapidly during the dwell period. The temperature of the jaws, as well as the amount of pressure and length of the dwell period, of the plates and jaws, may be regulated to compensate for the thickness of the book covers and other variables; therefore, by proper regulation of pressure, dwell and jaw temperature, each book may be finished during a few seconds dwell period between the plates and jaws.

From the foregoing, it will be observed that the presser mechanism is a self-contained unit, such that the presser cylinder 17 reacts in opposite directions between the platen 15 and actuator plate 38 during the pressing operation as indicated by the arrows in Figure 11. The spreading action is transmitted in tension through the tension rods 45 to the upper presser plate 16 such that the forces are isolated from housing 10 and transmitted directly to the book when the plates are closed.

*Creaser mechanism*

Referring to Figures 2–6, the creaser jaws 22 and 23 are in the form of elongated bars, each having a generally concave cross section as at 54 leading to their opposed working edges 55 which have a slightly rounded profile. The narrow working edges 55 delineate the shape of the creases which are impressed along the opposite side edges of the book. The lower creaser jaw 22 is mounted at the forward receiving edge 50 of the platen (Figure 3) and its working edge 55 projects upwardly above the top surface of the platen. To provide the floating action of the jaws with respect to the presser plates, the lower jaw is free to move vertically with respect to the platen.

The lower jaw 22 is yieldably mounted in an upper cross bar 56 which has its opposite ends supported by a pair of angle irons 57 (Figures 1 and 2) welded or otherwise secured to the side walls of housing 10. Bar 56 is recessed longitudinally as at 58 to receive the lower portion of the jaw, the jaw being supported by a pair of compression springs 60—60 (Figures 2 and 3), with its lower edge spaced above the bottom of recess 58 to proivde clearance. As best shown in Figure 3, each spring 60 has its lower end seated in a bore 61 of bar 56, while its upper end resides in a matching bore 62 formed in the lower portion of the jaw. The jaw includes a pair of hold-down screws, each having its upper end threaded into the jaw as at 63, with the shank of the screw passing downwardly through the spring. The heads 64 of each screw is engaged against the undersurface of bar 56 and thus holds the jaw down counter to the upward force exerted by the tension springs. The screws are adjusted to provide the clearance for floating movement of the jaw and to hold the jaw in a level position with its working edge 55 parallel with the top surface of the platen 15.

The floating lower jaw 22 is guided vertically by a pair of keys 65 secured to the opposite ends of the jaw by screws 66 (Figures 5 and 6). The keys 65 are slidably engaged in longitudinal key ways 67 formed in the respective tension bars 68 of the creaser frame 24, the bars being square in cross section. The rearward surface of jaws 22 is in sliding engagement with the forward edge of the platen, the platen preferably including a flat bearing plate 70 recessed in its forward edge and in bearing contact with the surface of the jaw as detailed in Figure 3.

Figure 13:
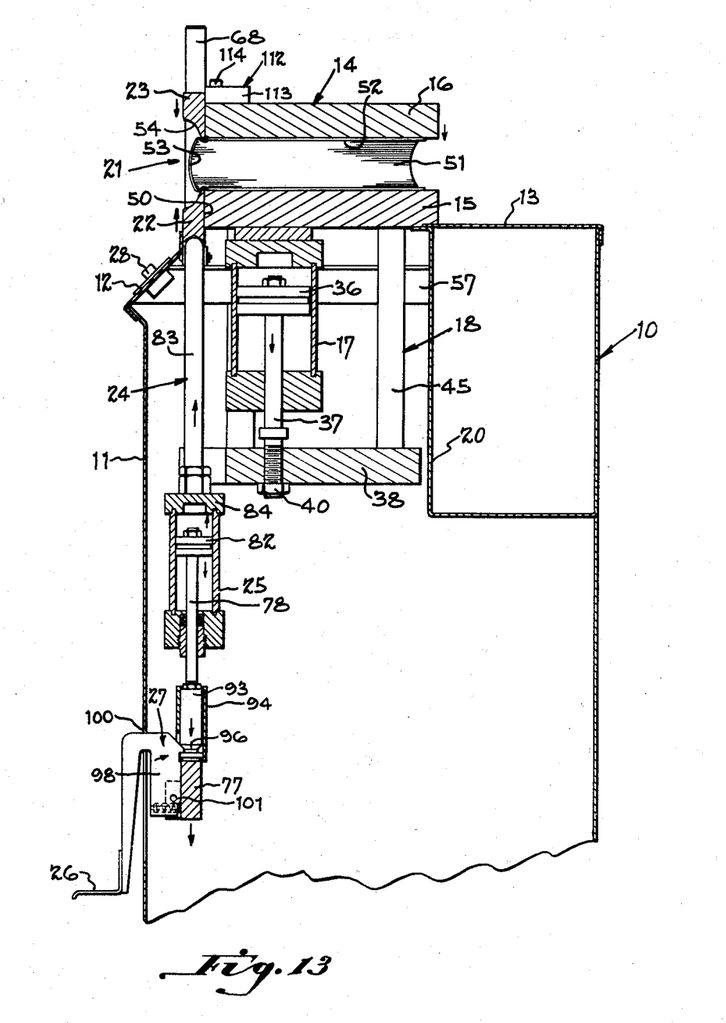
Figure 13 is similar to Figure 11 and shows the creaser jaws in pressure engagement with the joints of the book in sequence to the closing of the presser plates.

The upstanding working edge 55 of jaw 22 provides a guide for locating the rounded edge of the book when it is placed in pressing position. The concave portions 54 of the jaws provide clearance for the opposite edges of the rounded end of the book when the jaws are closed (Figure 13).

The upper jaw or nipper 23 is similar to the lower jaw and its opposite ends are secured rigidly to the square tension bars 68 of the creaser frame 24 by respective horizontal keys 71 fitted into matching key ways formed in the jaw and tension bars (Figures 2 and 5). The jaw is secured additionally by horizontal screws 72 passing through the bars at right angles to the keys, the inner ends of the screws being threaded into the opposite ends of the jaws. The keys 71 thus transmit the pull-down force of bars to the jaw while the screws hold the parts firmly in assembly.

It will be seen in Figures 2 and 6, that the tension bars 68 are slidably confined in three pairs of bearing blocks secured to the presser frame 18. The upper bearing blocks, which are indicated at 73, are secured to the upper presser plate 16; the intermediate bearing blocks, indicated at 74 are secured to the platen 15; the lower bearing blocks 75 are secured to the actuating plate 38 of the presser frame. The respective pairs of bearing blocks are secured to the plates of the presser mechanism by screws or the like as indicated at 76. The bearing blocks preferably include fittings (not shown) to supply lubricant to the bearing surfaces.

Referring to Figure 2, the lower end of creaser frame 24 includes a cross bar 77 having its opposite ends secured by keys 71 and screws 72 to the respective tension bars, as described with reference to the upper jaw. The creaser or nipper cylinder 25 is suspended from the upper cross bar 56 previously noted, and its piston rod 78 is movable along a vertical axis into abutment with the lower cross bar 77 to apply the creasing pressure. The creaser cylinder includes an upper and lower conduit 80 and 81, preferably flexible, each conduit including a fitting 43 threaded into bores which communicate with the cylinder above and below the piston 82. When hydraulic pressure is conducted by way of the upper conduit 80, piston rod 78 moves downwardly into abutment with the lower cross bar 77, thus imposing a pull-down force on the tension bars 68 which is transmitted in tension to the upper jaw 23.

The creaser frame 24 is suspended by a compression rod 83 having its upper end connected to the upper cross bar 56 and its lower end connected to the head 84 of the creaser cylinder. The upper end of the compression rod passes through a central opening in cross bar 56 and includes a slot 85 traversed by a screw 86 passing through cross bar 56 (Figure 4). The upper end of the compression rod is rounded as at 87, the rounded end being engageable with a conical recess 88 formed in the lower surface of the lower creaser jaw 22.

When the creaser jaws are open as in Figure 2, the cross screw 86 engages the lower end of the slot, thus suspending the compression rod and cylinder from the upper cross bar 56. The piston rod 78 is held in its raised position by hydraulic fluid which is trapped beneath piston 82 of the creaser cylinder 25.

As noted earlier, the creaser frame is arranged to be lowered to bring the upper jaw temporarily into clamping engagement with the book by depressing the foot-operated treadle 26 which is secured to lower cross bar 77. The creaser frame and its upper jaw normally may be held in the elevated position of Figure 2 by a pair of tension springs 90 having their lower ends anchored to cross bar 77 as at 91 and their upper ends anchored as at 92 to the presser frame. These springs counter-balance the weight load of the creaser frame and normally pull cross bar 77 upwardly.

Figure 10:
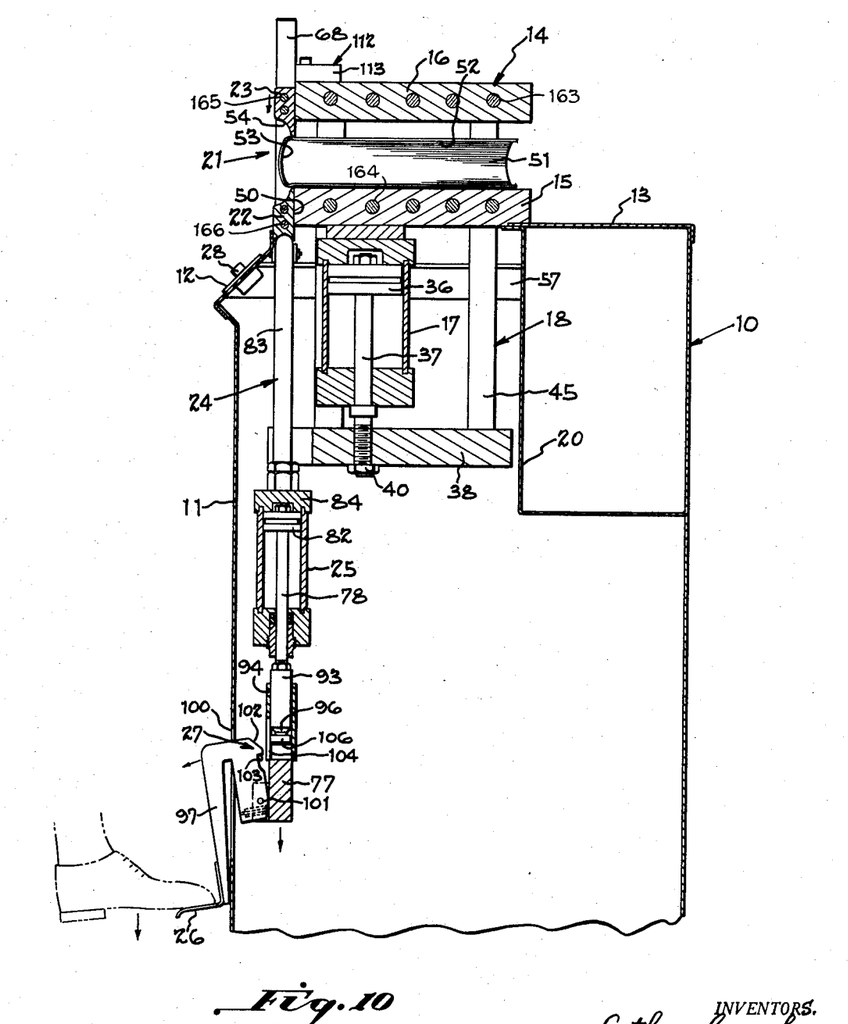
Figure 10 is a general side elevation similar to Figure 1, but showing the upper creaser jaw shifted by treadle operation into clamping engagement with the edge of a book. This operation is the first step prior to starting the automatic operating cycle.

When the treadle is depressed, the creaser frame 24 is lowered, counter to the influence of springs 90, thus shifting the lower cross bar 77 downwardly away from the end of the piston rod and lowering the upper jaw. When the upper jaw contacts and engages the book by treadle action, the cylinder is suspended from the upper cross bar as shown in Figure 10.

When hydraulic pressure is applied by way of upper conduit 80, with the cross bar 77 held down with the treadle, the piston rod 78 moves downwardly into engagement with lower cross bar 77, while the cylinder and compression rod 83 move upwardly, causing the rounded end 87 of the rod to engage the recesses of the lower jaw. The piston rod and compression rod thus act in opposite directions to force the creaser jaws toward one another, as indicated by the arrows in Figure 13. During downward piston motion, the hydraulic liquid trapped beneath the piston is exhausted by way of conduit 81.

Since the tension rods 68 of the creaser frame are slidably confined in the bearing blocks 73, 74 and 75, the creaser jaws are accurately guided with respect to the presser plates. It will be apparent, that since the compression rod 83 engages the lower jaw at its center, while the tension rods pull down the upper jaw from its opposite ends, the creasing pressure is self-contained within the creaser mechanism and is applied independently of the presser plates. Since the compression springs 60 support the lower jaw yieldably for vertical motion, it will be apparent that the jaws are free to float with respect to the book which is firmly clamped between the presser plates. Accordingly, equalized pressure is applied to the joints on both sides of the cover to create uniform creases and to avoid any forces tending to distort the book. It will also be noted that the compression rod 83 engages the lower jaw at a central point along its length; therefore, the lower jaw is free to rock lengthwise and provide balanced or equalized creasing pressure along the length of the book.

The lower end of the piston rod 78, which engages the cross bar 77, comprises a latch plunger 93 slidably confined in a cylindrical sleeve 94 welded as at 95 to the lower cross bar 77. Plunger 93 is slidable within the sleeve and the sleeve is somewhat longer than the total downward stroke of the upper jaw. Thus, as shown in Figure 10, the sleeve acts as a guide with respect to the plunger to maintain the cross bar and the plunger in alignment when the creaser frame is lowered with the treadle. The lower portion of the latch plunger includes a latching groove 96 which coacts with the treadle, as described below.

Figure 12:
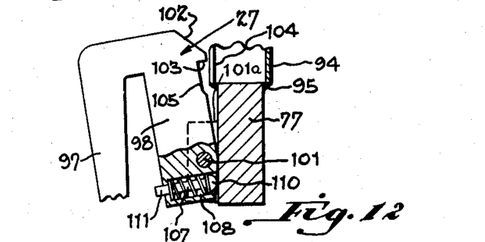
Figure 12 is an enlarged fragmentary view detailing the treadle latch mechanism in the position of Figure 11.

The treadle 26 includes a leg 97 depending downwardly from a swinging latch arm 98 passing through a vertical slot 100 formed in the front wall 11 of the housing (Figures 11 and 12). The latch arm 98 is pivotally connected to the cross bar 77 by a pivot pin 101 (Figure 12). The pivot pin passes through a pair of lugs 101a joined by welding or the like to cross bar 77 and residing on opposite sides of latch arm 98. The upper end of the latch arm has a downwardly inclined cam surface 102 leading to a latch finger 103 which passes through a slot 104 of sleeve 94 and interfits the groove 96 of the latch plunger. Immediately beneath the latch finger 103, the latch arm includes a notch 105 which interfits the head 106 of the latch plunger. The above mechanism comprises the latch mechanism previously indicated at 27.

The treadle is normally latched to the plunger as shown in Figure 1 by a compression spring 107 (Figure 12) seated in a bore 108 formed in the lower portion of the latch arm 98. One end of the spring is seated in the bore and its opposite end is seated upon the rounded head 110 of a spring plunger, the plunger including a shank 111 passing through the spring and slidably guided in a bore of the latch arm, with the outer end of the shank projecting outwardly. The rounded end of the plunger bears against the cross bar 77 and thus maintains the treadle in the latching position.

When the operator actuates the treadle to lower the upper jaw (Figure 11), the treadle first swings in an arc about the pivot pin 101 sufficiently to withdraw latch finger 103 from groove 96, thus allowing the cross bar and creaser frame to be lowered with respect to the latch plunger 93. As noted earlier, the piston 82, piston rod 78 and plunger remain in elevated position during the preliminary clamping operation by virtue of hydraulic fluid trapped beneath the creaser piston 82.

After the presser plates engage the book under compression at the start of a cycle, and the hydraulic fluid is by-passed to the top of the creaser cylinder, piston rod 78 descends until the head 106 of the latch plunger engages the cross bar to apply the creaser pressure to the jaws. The operator then may release the treadle, causing it to swing about pivot point 101 under the influence of spring 107, whereby the latching finger again engages the groove 96. Accordingly, when the piston rod and plunger ascend to the open position (Figure 1), the treadle and cross bar are latched to plunger 93 and are carried upwardly with it.

In the event that the treadle is released before the plunger descends, then the head 106 of the plunger engages the downwardly inclined surface 102 above the latch fingers, thereby camming the latch arm outwardly to reestablish the latching engagement.

Although the counter springs 90 of the creaser frame have sufficient force to bias the creaser frame normally in its upward position, the latching device 27 provides positive upward movement of the frame to overcome any sticking of the jaws at the end of the creasing cycle.

As noted with respect to the presser plates, the creaser jaws also include heating elements to maintain them at a desired creasing temperature. These elements may extend longitudinally of the jaws in bores provided for them.

Figure 9:
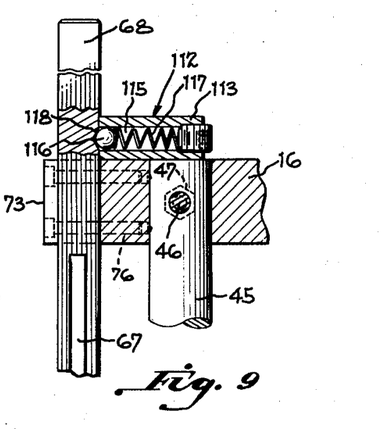
Figure 9 is an enlarged fragmentary sectional view taken along line 9—9 of Figure 7, showing the detent mechanism of the creaser frame.

If desired, the creaser frame may be latched mechanically in elevated position by a pair of detent devices 112 mounted upon the upper presser plate 16 and engaging the tension bar 68 of the creaser frame. As shown in Figure 9, each detent comprises a block 113 secured by screws 114 to the top of the presser plate adjacent the tension bars. Each block includes a bore 115 in which is slidably confined a detent ball 116 engaged by a compression spring 117. The detent ball engages a conical recess 118 formed in each tension bar, the recesses being located to be engaged by the detents in the elevated position of the frame.

As outlined with respect to the presser mechanism, the hydraulic system includes a pressure regulating device and indicating gauge for controlling the creaser jaw pressure independently of the presser mechanism. This apparatus is disclosed later with reference to the hydraulic system shown in Figure 14. It will be understood from the foregoing, that the presser and creaser mechanisms operate independently, although the guide blocks 73, 74 and 75 precisely align the plates and jaws for accurate location of the creases.

*Hydraulic system*

The diagram shown in Figure 14 illustrates in a simplified way a hydraulic and electrical circuit suitable to provide the automatic cycles of operation. The hydraulic pump 30, previously noted with reference to Figure 1, is driven by the motor 120, the pump and the motor being mounted within the lower portion of housing 10 above the sump 32. The motor runs continuously while the machine is in operation, the hydraulic fluid being drawn from sump 32 through filter 34 by way of intake conduit 33 as previously noted.

The hydraulic system is shown in the starting position, with the upper presser plate and creaser jaw elevated in normal position to receive a book as in Figure 1, the piston of the presser cylinder 17 and creaser cylinder 25 being urged upwardly under hydraulic pressure. The cycle of operation is controlled by the solenoid operated reversing or cycle control valve 121 which is regulated by the start button 28, previously noted. The several components of the control system are shown diagrammatically to illustrate the principle of operation; their exact construction does not form a part of the invention and has been omitted.

As shown in Figures 14 and 15, the electrically operated cycle control valve 121 has two positions, and when deenergized, its plunger 122 may be biased by a spring 123 in the normal starting position. In this position, the necked portion 124 of the plunger provides communication from the pressure conduit 125 of the pump to the piston-elevating conduit 126. This conduit branches to the lower conduits 42 and 81 of the presser and creaser cylinders to hold their pistons in elevated position by hydraulic pressure. In order to maintain back pressure in the hydraulic system, a main pressure regulating valve 127 is interposed in input conduit 128 between pump 30 and cycle control valve 121.

The main pressure regulating valve includes a pressure responsive element, such as a plunger 130, biased by a spring 131 and shifted under hydraulic pressure in a direction to compress the spring. The pressure setting of the valve may be regulated by a screw element 132 which varies the compression of spring 131. In the position of Figure 14, fluid pressure enters the valve body through input conduit 128, forcing the plunger to the right, thus uncovering the port of pressure conduit 125 leading to the cycle control valve 121 noted above. Since the pistons of the cylinders are both at their upper limits, the flow of hydraulic fluid by way of the piston-elevating conduit 126 is blocked; therefore, the pressure regulating plunger 130 is forced to the position uncovering the port which leads to the by-pass conduit 133.

By-pass conduit 133 leads to a by-pass valve 134, having a plunger 135 which is shifted to an open position by a cam element 136 attached to the piston rod 37 of the presser cylinder. The by-pass plunger is necked as at 137, and is biased toward its closed position by a spring 138, such that the valve is closed when the presser piston begins to shift downwardly. In the position of the parts shown in Figure 14, therefore, fluid pressure is directed to the piston-elevating conduit 126 and the excess pressure is by-passed through by-pass valve 134 back to the sump through conduit 139.

When the cycle control valve 121 is shifted to its second position by operation of start button 28 (Figure 15), the cycle control plunger 122 compresses spring 123 and blocks off the port leading to the piston-elevating conduit 126. In this position, the plunger aligns its necked portion 124 with a port leading to the piston-lowering conduit 140. This conduit branches to conduits 41 and 80 which are connected to the upper ends of the cylinders. Conduit 140 includes a pressure regulating valve 141 which regulates the working force of the presser mechanism. This valve is similar in principle to the main pressure regulating valve 127, including a screw element 132 for regulating the fluid pressure applied to the presser piston 36. A pressure gauge 142 connected to conduit 140 indicates the operating pressure of the presser mechanism.

As soon as the cycle is initiated, fluid pressure flows by way of conduit 140 to the upper end of the presser cylinder and its piston 36 begins its downward or working stroke. At this point, cam element 136 closes by-pass valve 134 to block off the by-passing circuit (conduit 133). During the downward piston motion, the fluid is exhausted from the lower end of the presser cylinder by way of conduit 42 and exhaust conduit 143. Conduit 143 includes an exhaust pressure regulating valve 144 similar to the main pressure regulating valve 127. Exhaust valve 144 is adjusted to provide sufficient back pressure normally to hold the pistons in elevated position; however, its back pressure is less than the working pressure which is directed to the presser cylinder by the main pressure regulating valve 127. The fluid passing through the exhaust valve is conducted by conduit 145 back to the sump 32.

When the presser mechanism engages the book and prevents further downward motion of piston 36, the hydraulic pressure above the piston builds up until the pressure control valve 141 is shifted under back pressure, according to its setting, to a relief position. At this point, the fluid is conducted by way of conduits 146 and 80 to the upper end of the creaser cylinder 25, thus causing the sequential operation of the two cylinders. During downward motion of creaser piston 82, the exhaust fluid by-passes through conduit 81, through the exhaust valve 144 back to the sump.

When the creaser piston reaches its downward limit and imposes predetermined pressure upon the creaser jaws, the fluid acts upon the creaser control valve 147. This valve also may be similar to the main pressure regulating valve 127 and is adjusted by a screw element 132 to open at the required back pressure. A pressure gauge 148, similar to gauge 142, is connected to conduit 146 and indicates the creaser jaw pressure. The creaser control valve 147 is connected by way of conduit 150 to the sump. Accordingly, with both pistons in their lowered positions, the fluid from both cylinders by-passes continuously through their control valves 141 and 147 and circulates back to the sump, while the back pressure created by the valve holds the pressure and creaser mechanisms under pressure for the dwell period. In the present example, the dwell period is governed by a time delay relay TR in the electrical control system.

When the relay times out, the cycle control valve 121 is deenergized and its spring 123 shifts the valve plunger 122 back to the normal position of Figure 14. At this point, the valve plunger 122 blocks off the piston lowering conduit 140 and directs the fluid pressure to the piston-elevating conduit 126. This causes the pistons to be shifted back to the elevated position. As the pistons shift upwardly, the fluid above the piston is exhausted by way of lines 41, 80, 146, through the presser and creaser control valves 141 and 147, and by way of conduit 150 to the sump.

As noted earlier, the main pressure control valve 127 is set for a higher pressure than the control valves 141 and 147, such that a greater amount of pressure is applied beneath the pistons to overcome the resistance of the pressure control valves 141 and 147. It will also be noted that the by-pass valve 134 is closed during the upward motion of the pistons, such that the fluid pressure is conducted in a positive manner to the lower ends of the cylinders.

*Electrical circuit*

The pump motor 120 is energized by the power lines 151 which include a manual switch 152 for starting the motor. The control circuit is powered by lines 153 and 154 which regulate the operation of cycle control valve 121. The start button 28 normally is open and its contacts are interposed in the branch line 155. A normally closed stop button 156 is also interposed in line 155. The stop button is used only to open the presser and creaser mechanism in an emergency after the cycle is started.

When the start button is depressed, it completes a circuit from power line 153, through the coil of the time delay relay TR to the second power line 154. The time delay relay includes a holding contact 157 interposed in line 158 which shunts the start button. When the start button is depressed, the holding contact 157 is closed by relay TR to keep the relay energized, allowing the start button to be released.

The coil 160 of the cycle control valve 121 is interposed in lines 161 and 162, leading from the shunt line 158 to the opposite line 154 of the control circuit. Therefore, the valve plunger 122 is shifted to its second position (Figure 15) when the solenoid is energized. After the start button is closed momentarily therefore, the relay TR holds valve 121 in its pressing and creasing position for the dwell period. Relay TR is adjustable so as to vary the dwell period; however, since it is a conventional unit, the adjustment device has been omitted.

After relay TR has timed out, during which period both the presser plates and creaser jaws have been shifted sequentially to operating position, it opens its holding contact 157 in the bypass line 158 and thus deenergizes the relay coil and valve coil 160, allowing the cycle control valve to shift back to its normal position, causing the plates and jaws to open.

As noted earlier, the presser plates normally are not heated; however, heating elements for the upper presser plate are indicated at 163 and the elements of the platen are indicated at 164. The creaser heaters for the upper and lower jaws are indicated respectively at 165 and 166. The heaters are energized by way of lines 167, through control switches 168 and branch lines 170. Each branch line preferably includes a suitable rheostat 171 which may be adjusted to regulate the temperature. The circuit through the heating elements is completed by way of lines which are connected in common to the opposite power line 154.

We claim:

1. A book pressing and creasing machine, comprising, a machine frame, a platen mounted upon said frame, a presser plate mounted parallel with the platen and normally spaced outwardly therefrom, a presser frame connected to said presser plate, power means interconnected with said platen and presser frame for shifting the said presser plate toward said platen, thereby to press a book disposed between the presser plate and platen, a stationary creaser jaw residing adjacent an edge of said platen, a movable creaser jaw disposed in parallelism with the stationary jaw, a creaser frame connected to said movable creaser jaw, a second power means interconnecting said stationary and movable creaser jaws for shifting said jaws toward one another, thereby to crease the edge of a book engaged between the said platen and presser plate, and shiftable control means connected to the first and second power means, said control means upon being shifted, energizing the first power means, thereby to press the book between the platen and presser plate, said control means being responsive to the pressure imposed upon the book by the presser plate to energize the second power means for creasing the edge of the book while the same is engaged between the platen and presser plate.

2. A book pressing and creasing machine comprising, a machine frame, a stationary platen mounted upon said frame in a generally horizontal plane, a movable presser plate mounted parallel with the platen and normally spaced outwardly therefrom, a presser frame connected to said presser plate, power means interconnected with said platen and presser frame for shifting the said presser plate toward said platen, thereby to press a book disposed between the presser plate and platen, a stationary creaser jaw residing adjacent an edge of said platen, a movable creaser jaw disposed in parallelism with the stationary jaw, a creaser frame connected to said movable creaser jaw, a second power means interconnecting said floating and movable creaser jaws for shifting said jaws toward one another, thereby to crease the edge of a book which is engaged between the presser plate and platen, and shiftable control means connected to the first and second power means for energizing the same, said control means upon being shifted to one position, sequentially energizing the first and second power means in a direction for pressing and creasing the book, and upon being shifted to a second position, energizing the first and second power means in an opposite direction.

3. A book pressing and creasing machine comprising, a platen, a presser plate mounted parallel with the platen and normally spaced outwardly therefrom, whereby a book may be placed between the platen and presser plate, a presser cylinder including a piston, said cylinder and piston respectively connected to the platen and presser plate for shifting the same toward one another into engagement with a book, a first creaser jaw normally residing adjacent an edge of said platen, a second creaser jaw mounted parallel with the first jaw, the second creaser jaw normally spaced outwardly from the first jaw, whereby an edge of a book which is placed between the platen and presser plate is disposed between said jaws, a creaser cylinder including a piston, said cylinder and piston relatively interconnecting the first and second jaws for shifting the same toward one another, a fluid pressure system communicating with the presser cylinder and including control means which directs fluid pressure to the presser cylinder in a direction to shift the platen and presser plate into engagement with the book, said fluid pressure system including pressure responsive means communicating with the creaser cylinder and directing fluid pressure to the cylinder in a direction to force said creaser jaws into pressure engagement with the edge of the book after the book is engaged between the platen and presser plate.

4. A book pressing and creasing machine comprising, a platen, a presser plate mounted parallel with the platen and normally spaced outwardly therefrom, whereby a book may be placed between the platen and presser plate, a presser cylinder including a piston, said cylinder and piston respectively connected to the platen and presser frame for shifting the same toward one another into engagement with a book and away from one another, a first creaser jaw normally residing adjacent an edge of said platen, a second creaser jaw mounted parallel with the first jaw, the second creaser jaw normally spaced outwardly from the first jaw, whereby an edge of a book placed between the platen and presser plate is disposed between said jaws, a creaser cylinder including a piston, said cylinder and piston relatively interconnecting the first and second jaws for shifting the same toward one another into engagement with a book and away from one another, a fluid pressure system communicating with the presser cylinder and including shiftable control means which in a first position directs fluid pressure to the presser cylinder in a direction to shift the platen and presser plate into pressure engagement with the book, said control means in a second position shifting the same in the opposite direction, said fluid pressure system including pressure responsive means communicating with the creaser cylinder and directing fluid pressure thereto in a direction to shift said creaser jaws into pressure engagement with the edge of the book after the book is engaged between the platen and presser plate, said fluid pressure system communicating with the creaser cylinder, the control means in said second position directing fluid pressure to the creaser cylinder in a direction to separate said jaws, and a time delay device connected to the shiftable control means, said time delay device shifting the control means to said second position after a timed period, thereby to shift the presser plate away from the platen and to separate the jaws.

5. A book pressing and creasing machine comprising, a machine frame, a platen mounted upon said frame, a presser plate mounted parallel with said platen, a presser frame connected to said presser plate, said presser frame including tension rods projecting from said presser plate to and beyond said platen, a connecting member joined to said tension rods and spaced from the platen, power means interposed between the platen and actuating plate for shifting the presser plate toward or away from the platen, a stationary creaser jaw, yieldable means connecting the stationary jaw to an edge of said platen, a movable creaser jaw, a creaser frame connected to the movable jaw, said creaser frame including tension rods connected to the movable creaser jaw and extending to and beyond the stationary jaw, a second power means interposed between the creaser frame and said stationary jaw for shifting the movable jaw toward or away from the stationary jaw, and control means connected to said first and second power means for energizing the same, whereby a book disposed on the platen is engaged under pressure between the platen and presser plate, and said stationary and movable creaser jaws engage an edge of the book under pressure, the creaser frame and power means actuating the stationary and movable creaser jaws independently of the presser plate, whereby said jaws are free to float relative to the platen and presser plate while engaged under pressure against opposite sides of the book.

6. A book pressing and creasing machine comprising, a machine frame, a platen mounted in a generally horizontal plane upon said frame, a presser plate mounted parallel with said platen, a presser frame connected to said presser plate, said presser frame including tension rods projecting from said presser plate to and beyond the said platen, guide means on said platen slidably engaging said tension rods for axial movement of said rods relative to the platen, a connecting member joined to said tension rods and spaced from the platen, power means interconnected between the platen and connecting member for shifting the presser plate toward or away from the platen, a stationary creaser jaw, yieldable means connecting the stationary jaw to an edge of said platen, a movable creaser jaw, a creaser frame, including tension rods connected to the movable creaser jaw and extending to and beyond the stationary jaw, a second power means interconnected between the creaser frame and said stationary jaw for shifting the movable jaw toward or away from the stationary jaw, and control means connected to the first and second power means for regulating the operation thereof, whereby a book disposed on the platen is engaged under pressure between the platen and presser plate while said stationary and movable creaser jaws engage an edge of the book along opposite sides, the creaser frame and second power means actuating the stationary and movable creaser jaws independently of the presser plate, whereby said jaws are free to float relative to the platen and presser plate while engaged under pressure against opposite side edges of the book.

7. A book pressing and creasing machine comprising, a machine frame, a platen mounted upon said frame, a presser plate mounted parallel with the platen and normally spaced outwardly therefrom, whereby a book may be placed between said platen and presser plate, a presser frame connected to the presser plate, a presser cylinder including a piston, said cylinder relatively connected to the presser frame and platen for shifting the presser plate and platen into pressure engagement with the book, a first creaser jaw residing adjacent an edge of said platen, a second creaser jaw mounted parallel with the first creaser jaw, a creaser frame connected to the second creaser jaw, said jaw normally spaced apart to receive the edge of a book which is disposed between the platen and presser plate, guide means connected to the machine frame and slidably engaging the creaser frame, for shifting motion of the creaser frame, treadle means connected to the creaser frame for shifting the second creaser jaw toward said first creaser jaw, whereby said jaws establish a clamping engagement with the edge of the book upon actuation of the treadle, a creaser cylinder including a piston, said cylinder and piston including means relatively engageable with the first creaser jaw and creaser frame for forcing the creaser jaws into pressure engagement against opposite side edges of said book, and a fluid pressure system including control means, said fluid pressure communicating with the presser cylinder for shifting the platen and presser plate into engagement with the book, said control system communicating with the creaser cylinder and including control means directing fluid pressure to the creaser cylinder after the presser cylinder exerts a predetermined pressure upon the book, whereby the creaser cylinder forces said jaws under pressure into engagement with the edges of the book after the jaws are closed by the treadle means and after the presser plate and platen engage the book.

8. A book pressing and creasing machine comprising, a machine frame, a pair of presser plates mounted parallel with one another and normally spaced apart, whereby a book may be placed therebetween, a presser cylinder including a piston, means relatively interconnecting the piston and cylinder to the presser plates for actuating the same under fluid pressure, a pair of creaser jaws mounted adjacent the edges of the presser plates, a creaser cylinder including a piston, said cylinder and piston relatively interconnected to said creaser jaws for actuating the same, a manually controlled reversing valve, including a first and second delivery port, a shiftable control element in said valve, a source of fluid pressure connected to said valve, conduit means connecting said reversing valve to the opposite ends of the presser cylinder, whereby the piston of said cylinder is actuated in directions to shift the presser plates toward or away from one another in response to the position of said shiftable control element, and a second conduit means communicating with the first conduit means and with the creaser cylinder for actuating the creaser piston in a direction to close said jaws in response to back pressure of the presser cylinder, said back pressure being developed in response to the pressure of the presser plate and platen upon the book.

9. A book pressing and creasing machine comprising, a machine frame, a platen mounted on said frame, a presser plate mounted parallel with said platen and normally spaced therefrom, a presser cylinder including a piston, means interconnecting the cylinder and piston relatively to the platen and presser plate, said means shifting said platen and presser plate toward one another in response to fluid pressure directed to the presser cylinder, a pair of creaser jaws mounted adjacent the edges of the platen and presser plate, said jaws normally spaced apart, a creaser cylinder including a piston, means relatively interconnecting the cylinder and piston with said creaser jaws, said means closing said jaws in response to fluid pressure directed to the creaser cylinder, a fluid pressure system communicating with said presser cylinders, normally closed control valve in said system for supplying fluid pressure to the presser cylinder, whereby upon opening said valve, fluid pressure is admitted to the presser cylinder in a direction to force the platen and presser plate under pressure toward one another and against opposite sides of a book disposed therebetween, and a pressure responsive valve communicating with said cylinder, said valve being normally closed and being opened in response to predetermined fluid pressure acting upon the piston of the presser cylinder, said valve directing said fluid pressure to the creaser cylinder to shift the piston thereof in a direction to close said jaws under pressure against the opposite side edges of the book after the book is engaged between the presser plate and platen.

10. A book pressing and creasing machine comprising, a machine frame, a platen mounted in a generally horizontal plane upon said frame, a presser plate mounted parallel with said platen, a presser frame connected to said presser plate and extending below the platen, a presser cylinder having a piston, said cylinder residing beneath the platen, said cylinder and piston relatively interconnecting said platen and presser frame for shifting the same relative to one another in said parallel plane, a stationary creaser jaw residing adjacent an edge of said platen, a movable creaser jaw parallel with said stationary jaw, a creaser frame connected to said movable creaser jaw and extending below the stationary creaser jaw, a creaser cylinder having a piston, said cylinder residing beneath the stationary creaser jaw, said cylinder and piston positioned to engage the lower creaser jaw and creaser frame and exert a spreading force therebetween, thereby forcing said jaws toward one another, treadle means connected to said creaser frame and adapted to be engaged by an operator for shifting said movable creaser jaw downwardly independently of said creaser cylinder, and means for supplying fluid pressure to said presser cylinder and creaser cylinder, whereby a book placed upon said platen is clamped between said creaser jaws by operation of said treadle means in position for engagement by said presser plates, the book thereafter being pressed and creased upon operation of said fluid pressure supply means to actuate the presser cylinder and creaser cylinder.

11. In a book creasing machine, a stationary creaser jaw, a movable creaser jaw disposed substantially in parallelism with the stationary jaw, a creaser frame including tension elements connected to opposite ends of the movable jaw and extending to and beyond the stationary jaw, said stationary jaw residing between the movable jaw and lower portion of the creaser frame, power means interposed between said stationary jaw and the lower portion of the creaser frame beyond the stationary jaw, said power means including a pair of thrust elements movable axially under power in forward and reverse directions, said thrust elements respectively establishing a single point abutment with said stationary jaw and lower portion of the creaser frame at an intermediate point along the jaw and frame, whereby said thrust elements exert a thrust force between said stationary jaw and creaser frame to force said jaws into pressure engagement against a book disposed between said jaws, said single point abutment of the thrust elements providing substantially equalized pressure along opposite sides of the book, and treadle means connected to said creaser frame for actuating the frame and jaw independently of the said power means, said treadle means upon being actuated, closing said jaws and clamping the book therein prior to the application of pressure to the jaws by said power means.

12. In a book creasing machine, a machine frame, a movable creaser jaw, a pair of tension rods connected to the opposite ends of movable creaser jaw and extending downwardly therefrom, a cross member connected to said tension rods below said movable creaser jaw, a stationary creaser jaw residing between said movable jaw and cross member, guide means slidably interconnecting said stationary creaser jaw and tension rods for longitudinal motion of said rods, means connecting the stationary jaw to the machine frame for supporting the same, a creaser cylinder having a piston, a source of fluid pressure connected to said cylinder, said cylinder residing beneath the stationary jaw, said cylinder and piston including thrust elements respectively engageable with said stationary jaw and cross member and exerting a spreading force therebetween upon application of fluid pressure to the cylinder, thereby to force the movable jaw toward said stationary jaw, a depressible treadle pivotally connected to said cross member, a latch element extending from the treadle, a cooperating latch element on the thrust element which engages the cross member, said latch element normally connecting the thrust element to the cross member, said latch element disengaging the same when the treadle is depressed, said treadle upon being depressed shifting the movable creaser jaw toward the lower jaw independently of the said thrust element, whereby a book interposed between said jaw is clamped in position therebetween prior to the actuation of said creaser cylinder and application of the creasing pressure thereby, said latch element latching the treadle to the cross member upon application of creasing pressure by said cylinder.

References Cited in the file of this patent
UNITED STATES PATENTS

| | | |
|---|---|---|
| 2,151,991 | Schramm | Mar. 28, 1939 |
| 2,307,333 | Pierson | Jan. 5, 1943 |
| 2,508,585 | Stone | May 23, 1950 |
| 2,714,732 | Traettino | Aug. 9, 1955 |